J. M. BAILEY.
Tire Tightener.
No. 71,676. Patented Dec. 3, 1867.
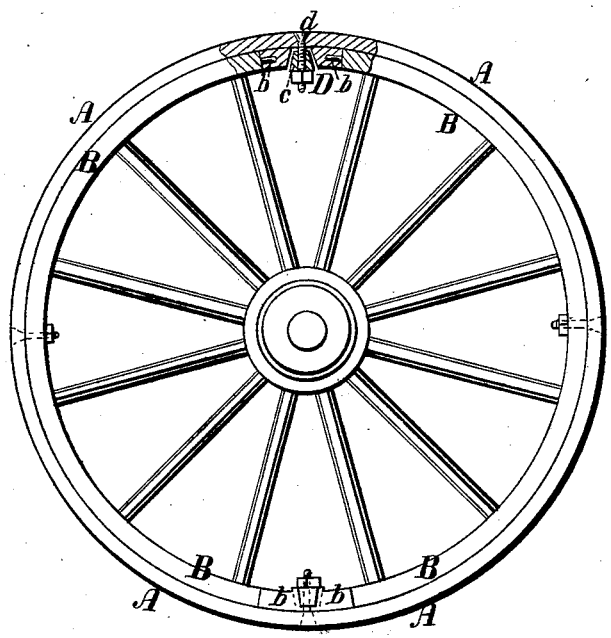
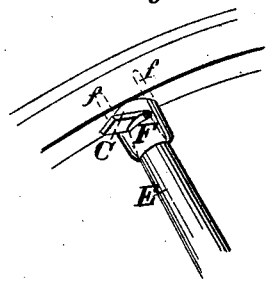

United States Patent Office

JULIUS M. BAILEY, OF INDIANAPOLIS, INDIANA.

Letters Patent No. 71,676, dated December 3, 1867.

---

IMPROVEMENT IN WHEELS.

---

The Schedule referred to in these Letters Patent and making part of the same.

---

TO ALL WHOM IT MAY CONCERN:

Be it known that I, JULIUS M. BAILEY, of Indianapolis, Marion county, Indiana, have invented a new and useful Improvement in Wheels; and I do hereby declare that the following is a full, clear, and exact description thereof, which will enable others skilled in the art to make and use the same, reference being had to the accompanying drawings, forming part of this specification.

This invention relates to an improvement in wheels, and consists in the employment of a wedge-shaped piece of metal keying between the felloes, and secured to the tire by a screw-bolt, by screwing on which the tire can be tightened on the rim of the wheel; also of a bed or socket, wherein the end of the spoke can be stepped, and a wedge driven home to tighten the spoke as it gets loose. In the accompanying drawings—

Figure 1 is a view of a wheel, having my improved arrangement for tightening the tire.

Figure 2 is a top view thereof from the inside of the felloes, and

Figure 3 is a perspective view of a spoke, stepped in the bed, and with the wedge ready to drive home.

Similar letters of reference indicate corresponding parts.

A is the tire, and B the felloes of the wheel. The felloes, at their extremities, fit into the sockets $b$, between which keys the wedge C, bearing tenons on either side, which groove into mortises on the felloes, or mortised to receive tenons borne on the sockets. The wedge C is secured by a screw-bolt, $d$, countersunk in the outer rim of the tire, and passing through it and the wedge C, and secured by a nut, D, which is screwed up as the tire loosens, and, wedging between the felloes, tightens the tire upon them. E is a spoke, and F the bed or socket into which it is stepped, secured to the felloe by the arms $f\,f$. The wedge G is driven through a slot in the head of the socket, thereby tightening the spoke as it gets loose.

Having thus described my invention, what I claim as new, and desire to secure by Letters Patent, is—

1. The socket $b$, when provided with grooves upon one side, in which the tenons of the felloes fit, and with grooves upon their inner sides to receive the tenons formed upon the wedge C, said wedge adjusted by means of the bolt $d$, whose head is countersunk in the tire A, and the nut D, all constructed as described, for the purpose specified.

2. Having the spoke E stepped into the slotted bed or socket F, in combination with the wedge G, all substantially as set forth and described.

The above specification of my invention signed by me, this 3d day of April, 1867.

JULIUS M. BAILEY.

Witnesses:
GEORGE HANEY,
S. C. NOLIN.